Figure 1:
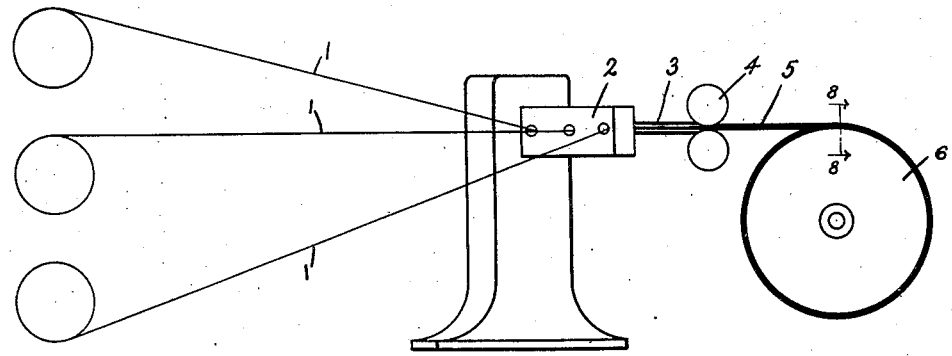

Jan. 9, 1934.     W. G. LERCH     1,943,273

TIRE BEAD

Filed May 13, 1932

INVENTOR.
William G. Lerch
BY
Fay, Oberlin & Fay
ATTORNEYS

Patented Jan. 9, 1934

1,943,273

UNITED STATES PATENT OFFICE 1,943,273

TIRE BEAD

William G. Lerch, Akron, Ohio, assignor, by direct and mesne assignments, to National-Standard Company, Niles, Mich., a corporation of Michigan Application May 13, 1932. Serial No. 611,001

12 Claims. (Cl. 154—14)

This invention relates to automobile tire beads and to their manufacture, and is in some respects a further, and distinct, development of the invention set forth in my application Serial No. 552,401, filed July 22, 1931.

In wire beads, as known prior to my above-identified invention the practice has been to insert reenforcing wires by first arranging such wires side by side in the form of a tape held together by a coating of rubber composition or else to use metallic strands built up by weaving, sometimes in the form of a flat braid and sometimes in the form of a twisted or weft-bound cable. All of these methods and their various modifications have been unsatisfactory for the reason that in practice it has been impossible with tape or braid to arrange the reenforcing elements throughout the stages of manufacture in the regular and predetermined arrangement desired, so as to form a properly disposed skeletal reenforcement correctly related to the final shape of the bead and at the same time in which all the elements of the reenforcement contributed equally and directly to the strengthening of the bead.

More in detail, the flat tape type of reenforcement has proved unsatisfactory for several means. Among these are that it is difficult to position the tapes so that a triangular cross-sectional arrangement of the reenforcing wires is maintained. If not maintained, the bead tends to roll sideways on its base, causing the tire to rim cut. Another reason is that in practice the wires of the tape, whether held together by a weft wire or not, lie so close together that the rubber coating between adjacent wires is either worn so thin as to be ineffective, or else wholly absent in spots. The flexing of the wires when the tire is in service without proper rubber coating causes friction and breakage.

In building of bead reenforcement by wires grouped otherwise than in a tape, it is important to have uniform coating on each member of the group to insure the proper triangular or other polygonal arrangement within the group. For convenience, such arrangement is hereafter designated as "substantially cylindrical", and by similar expressions. Such regularity is necessary to secure the proper building up of the groups into the circles of right triangular cross section which are necessary to keep the bead flat and firm on its base, preventing tilting and consequent rim cutting.

The present invention is particularly directed to the production of a bead in which each wire is uniformly coated, and thereby is directed to the attainment of the other features and results desirable in a tire bead of the class described, and to the avoidance of the defects of the prior art. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 2:
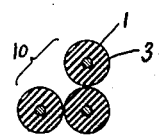
Figure 4:
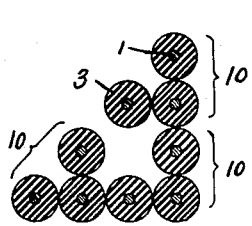
Figure 6:
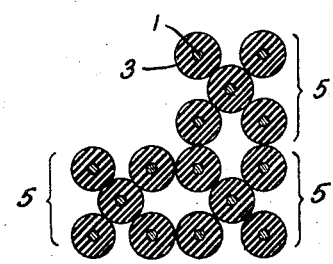
Figure 5:
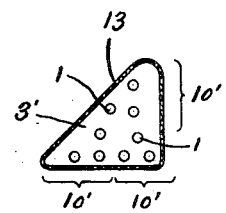
Figure 7:
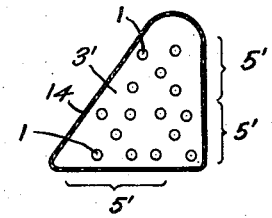

In said annexed drawing:

Fig. 1 is a diagrammatic side elevation of an apparatus for making my improved bead; Fig. 2 is an enlarged transverse section through a strand at an intermediate stage, and Fig. 3 a similar section of the final stage, both illustrating the simplest form of the invention; Figs. 4 and 5 in like manner illustrate a more complex bead; Figs. 6 and 7 similarly illustrate one more complex than that of the previous figures; and Fig. 8, an enlarged section on the line 8—8 of Fig. 1, shows one part of the method of forming the bead.

In making the tire bead, a suitable number of bare wires 1 are run through an insulating head 2 by which each is given an individual coating of plastic compound, as indicated at 3, the usual material being unvulcanized rubber. The wires are then assembled as by the rollers 4 into a strand 5 and these strands are wound in a plurality of turns on a bead former 6. During the winding, they are crowded into triangular arrangement by a tool 7 of a type common in the rubber tire industry, or by other suitable means.

Figure 8:
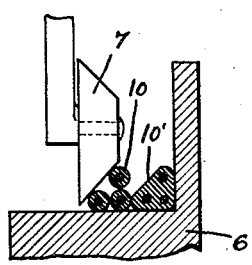

In building up the bead, the separately coated wires are arranged in the strands such as 5 in what may be termed a compact order, as opposed to the flat tapes known to the prior art. For example, if three wires are used they will be laid side by side in triangular cross section as shown in Fig. 2 and the successive turns will be of three-part strands 10. If a larger number of wires are employed, the strand will be similarly laid in a figure having a cross section which, roughly, will be symmetrical within a circumscribing circle. An example is the strand 5. This five-wire strand might be arranged with the wires at the points of a regular pentagon or otherwise, the arrangement shown being preferred but not the only possible one. Similar principles will apply to the use of strands having a greater number of wires. While the strand is being wound on the bead former 6, the tool 7 is used to compress the successive turns against one another into a formation such as that shown in Fig. 3 for a single three-wire strand or Fig. 5 for three strands of three wires each, or Fig. 7 for three strands of five wires each, all according to circumstances. In Fig. 8 the first strand is indicated as 10' and shown as compressed, and the second strand is indicated as 10 and is shown as not yet compressed. Ordinarily, a triple strand winding will be used in making any single bead, although this again is subject to variation within the principles of the inventon.

Figure 3:
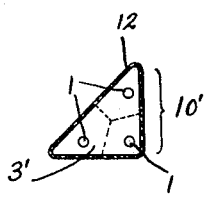

On account of the sticky and somewhat fluent character of the rubber coating 3, compression forms the strand into a homogeneous mass such as 10', with the wires 1 maintaining practically the same relative positions therein as they occupied in the uncompressed strand. This point is illustrated by comparison of Figs. 2 and 3. In Fig. 3 dotted lines are used to indicate approximately the planes of contact between the original coatings 3, but the mass of rubber, indicated in Fig. 3 by the reference character 3' is practically one continuous body.

By the operation described, the bead will take a finished form as indicated in Fig. 3, Fig. 5 or Fig. 7 according to its construction with its various reenforcing wires 1 occupying in the completed bead very nearly the same positions that were given them in building up the coated wires into strands and the strands into beads, Figs. 4 and 6, it being understood that Fig. 4 represents a preliminary stage in the formation of Fig. 5, and Fig. 6 represents a preliminary stage in the formation of Fig. 7.

The usual practice is for the formed beads to be covered with a cloth strip or wrapper such as 12, 13 or 14, but the beads may be used without a wrapper.

After the beads are formed they are vulcanized, thereby primarily fixing the wires 1 in their relative positions.

An important point in the formation of modern tire beads is that they have a broad, flat bearing surface at the bottom, so that they seat firmly on the rim and do not tend to roll. To this end a triangular formation is essential. The present process enables the initial triangular formation made on the form of 6 to be maintained in the subsequent steps of forming the bead, so that the wires are distributed with a reasonable degree of regularity throughout the entire cross section of the bead, or maintained in their relative positions and each is separated from the others, and kept within the body of the bead by a substantial layer of rubber, in the present invention, by the initial individual coating 3 which afterwards forms the single mass 3' while still maintaining the separation of its particular wire 1.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A method of forming tire beads which comprises coating wires separately with a sticky plastic composition, grouping the coated wires in paraxial relation, arranging said wires in successive turns in a formation of generally triangular cross section with the base inward, and maintaining the wires in formation by the mutual adhesion of said coatings.

2. A method of forming tire beads which comprises coating wires separately with a sticky plastic composition, grouping the coated wires in paraxial relation, arranging said grouped wires in successive group turns in a formation of generally triangular cross section with the base inward, and maintaining the wires in their group formation and the groups in the beads by the mutual adhesion of said coatings.

3. A method of forming material for the reenforcement of tire beads which comprises coating a plurality of individual wires with an adhesive plastic, arranging said coated wires into a group of compact cross section maintained by the adhesion of the coatings, and winding said group into a plurality of successive turns, maintaining said groups in fixed relation by the adhesion of the plastic while hardening the plastic.

4. A method of forming material for the reenforcement of tire beads which comprises coating a plurality of individual wires with an adhesive plastic, arranging said coated wires into a group of compact cross section maintained by the adhesion of the coatings, and winding said group into a plurality of successive mutually adjacent turns, maintaining said groups in fixed relation by the adhesion of the plastic while hardening the plastic.

5. A method of forming material for the reenforcement of tire beads which comprises coating a plurality of individual wires with an adhesive plastic, arranging said coated wires into a group of compact cross section maintained by the adhesion of the coatings, and winding said group into a plurality of successive turns of generally right triangular cross section with base inward, maintaining said groups in fixed relation by the adhesion of the plastic while hardening the plastic.

6. A method of making tire beads which comprises forming individual rubber-covered wires into strands, holding the strand formation by adhesion of the rubber covering, and winding said strands in layers, wide on the bottom and successively diminishing in width to the top.

7. A method of forming material for tire beads which comprises grouping a plurality of individually plastic-coated wires into generally cylindrical paraxial arrangement with their plastic coatings in lateral contact, winding the cylinder of wires in successive laterally-contacting turns.

8. A method of forming material for tire beads which comprises grouping a plurality of individually plastic-coated wires into generally cylindrical paraxial arrangement with their plastic coatings in lateral contact, winding the cylinder of wires in successive laterally-contacting turns, and compressing the whole so that the plastic coatings form a substantially continuous mass.

9. A method of making reenforced tire beads which comprises covering individual wires with a sticky, viscous plastic material capable of being hardened, grouping said covered wires in lateral contact in a strand, winding the strand on a bead former in layers diminishing in width from bottom to top, and compressing the wound strand into compact relationship while maintaining substantially the original relations of the wires.

10. A tire bead reenforcement comprising a plurality of strands laid side by side in layers of successively diminishing width, said strands each being composed of a plurality of parallel wires each individually coated with a rubber composition and maintained in strand relation by said composition, said strands being maintained in mutual relation by said composition.

11. A tire bead reenforcement comprising a plurality of strands laid side by side in layers of diminishing width, each of said strands being formed of a plurality of parallel wires individually coated with a rubber composition, said strand formation and said bead formation, respectively, being maintained by the properties of said composition.

12. A tire bead reenforcement comprising a plurality of strand turns each consisting of a plurality of wires each individually covered with rubber, said covered wires being grouped in parallel generally cylindrical arrangement, said strands being compressed into an arrangement presenting in cross section a triangular relation of the wires with the base on the inside face of the reenforcement, said rubber being without voids and maintaining the wires separated but in substantially their original distribution.

WILLIAM G. LERCH.